United States Patent [19]

Bollinger, Jr.

[11] 4,372,180

[45] Feb. 8, 1983

[54] GEAR MOTOR TORQUE REACTION ABSORBER

[75] Inventor: Parker A. Bollinger, Jr., Slidell, La.

[73] Assignee: Siemens-Allis, Inc., Atlanta, Ga.

[21] Appl. No.: 191,274

[22] Filed: Sep. 26, 1980

[51] Int. Cl.³ .................. F16H 57/02; F16M 1/00
[52] U.S. Cl. .................. 74/606 R; 74/421 A; 248/664; 248/665; 192/149
[58] Field of Search ............ 74/409, 410, 411, 411.5, 74/421 A, 606 R; 192/149; 248/618, 629, 630, 664, 665, 667

[56] References Cited

U.S. PATENT DOCUMENTS

| 1,445,946 | 2/1923 | Hillix | 248/618 |
| 1,798,846 | 3/1931 | Kennedy | 248/630 |
| 2,182,789 | 12/1939 | Cotanch | 74/411 |
| 2,905,009 | 9/1959 | Bollenbacher et al. | 74/412 |
| 3,159,045 | 12/1964 | Lohr | 74/411 |
| 3,187,209 | 6/1965 | Schmitter | 74/421 A |
| 4,265,131 | 5/1981 | Grover | 74/411 |

FOREIGN PATENT DOCUMENTS

| 694594 | 8/1940 | Fed. Rep. of Germany | 74/411 |
| 1001458 | 1/1957 | Fed. Rep. of Germany | 74/421 A |
| 250536 | 10/1926 | Italy | 74/421 A |

Primary Examiner—Lawrence J. Staab
Attorney, Agent, or Firm—F. W. Powers, III

[57] ABSTRACT

A gear motor assembly is disposed in a support structure in such a manner that it may rotate in a plane perpendicular to the output shaft thereof. Stops are provided for preventing the shaft from turning past a predetermined point. The motor assembly is located in the support structure by a resilient leaf spring which deflects when the stops are engaged.

4 Claims, 3 Drawing Figures

GEAR MOTOR TORQUE REACTION ABSORBER

BACKGROUND OF THE INVENTION

The present invention relates to gear motor drive assemblies, and more particularly to mounting means therefor.

Many present-day mechanisms require electric drives of the sort involving a relatively small motor and gear drive assembly, usually referred to as a gear motor. The gear motor is actually an integrated drive system, and in some applications is only required to provide a driven device with less than 360° of rotational torque. For instance, drum switches and similar controlling and switching apparatus are operated by turning them back and forth through an arc of less than 360°. Conventionally, a first switch is provided for starting the gear motion, and a limit switch or the like used to stop the gear motor so that the driven device is turned only to a predetermined point. However, simply deenergizing a motor will not cause it to stop, owing to the rotational inertia of the motor armature and drive elements. The motor will thus "overrun" past the turn-off position unless additional means are provided to positively stop rotation.

For this reason, it is conventional to provide a fixed stop adjacent a moving part of the drive or driven mechanism, and a coacting stop member on a movable part, such as the driven device or the drive shaft. Although the motor is deenergized before the movable stop reaches the fixed one, however, due to the overrunning tendency of the motor the stops eventually engage to provide a positive means for defining the travel of the shaft and associated driven mechanism. Unfortunately, the abrupt stop which occurs is highly detrimental to the motor and drive mechanism. In order to provide the necessary torque, the gear reduction unit is provided with a high mechanical advantage. Hence, the motor armature is spinning at a rapid rate when the mechanical stops engage. The gear drive mechanism is then forced to absorb the kinetic energy of the spinning armature, which frequently results in breakage of the drive mechanism.

In order to avoid this problem, it is conventional to provide a clutch between the motor and gear unit. The adjustment of the clutch slip is critical inasmuch as it must transfer a sudden application of torque, which occurs when the motor is first energized, in order to rapidly operate the driven mechanism. At the same time, the clutch must slip readily when the drive mechanism stops are engaged in order to absorb the kinetic energy of the still-moving rotor.

While considerable effort has been expended in the design and manufacture of such clutches their presence still adds an additional complication to the drive system, and moreover requires proper adjustment and maintenance. In addition, the presence of a clutch adds materially to the cost of the drive unit. For these reasons, it will be appreciated that it would be highly desirable to provide an improved, less expensive means for preventing breakage of the drive mechanism of a gear motor unit.

It is therefore an object of the present invention to provide an improved torque absorbing means for a gear motor unit.

Another object of the invention is to eliminate a clutch mechanism from a gear motor unit which utilizes positive mechanical stops to limit its travel.

Still another object is to provide an inexpensive torque absorbing means which is sufficiently compact to fit within conventionally sized gear motor support structures.

SUMMARY OF THE INVENTION

Briefly stated, in accordance with one aspect of the invention the foregoing objects are achieved by providing a rigid stop coupled to an output shaft of a gear motor assembly, and a fixed stop mounted rigidly in the path of the movable stop for defining the limits of rotation of the output shaft. The gear motor assembly is mounted in such a manner that it is free to rotate about the axis of the output shaft, and is held in position by a torque-absorbing spring means which is connected between the motor and the support structure. In a presently preferred embodiment, the spring means takes the form of an elongate leaf spring fixed to one end to the gear motor casing, and the other end of which extends through a slot in the support structure so as to allow longitudinal movement, while substantially preventing lateral movement of the spring.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying draws in which:

DESCRIPTION OF A PREFERRED EMBODIMENT

Figure 1:
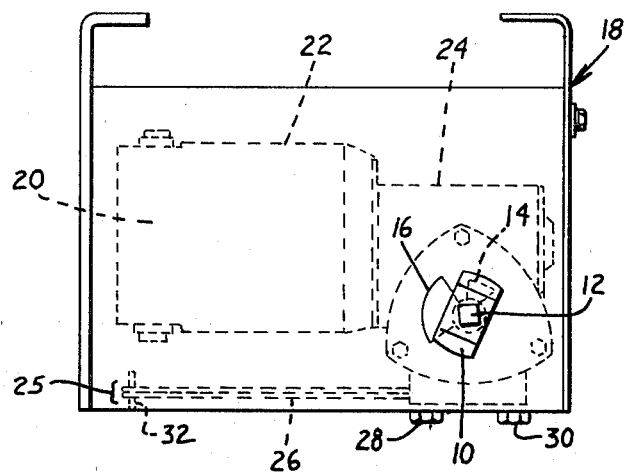
FIG. 1 is an elevation view showing a gear motor constructed according to the invention.

In FIG. 1 there is shown a typical gear motor unit of the type used to drive devices such as drum switches and the like. A coupling 10, which may be a yoke-type coupling or other appropriate member, is attached to output shaft 12 by means of a set screw or the like. A driven device (not shown) is attached to the coupling and rotates therewith. On the back side of the coupling, i.e., closer to the motor assembly, is a wedge-shaped abutment 14 shown in dotted lines and which is part of the coupling and thus fixedly attached to shaft 12. Another stop 16 is affixed to a support structure generally indicated at 18 which may generally be described as a box formed of metal plates which enclose a gear motor assembly comprising a drive motor 22 and gear unit 24.

A plate 25 forms the surface of structure 18 which obscures the gear motor from view. Stop 16 is rigidly affixed to the plate by spot welding, brazing, or other convenient method. Stop 16 thus forms a fixed reference with respect to the driven apparatus regardless of the orientation of the gearmotor. It will be understood that stops 14 and 16 cooperate to limit the rotation of shaft 12, and thus of the driven device, to predetermined arc whose extent is determined by the requirements of the driven device. While in the illustration it is anticipated that the rotational arc will be less than 360°, it will be appreciated that other stop means such as cams, helixes, toggle arrangments and the like can be used to establish a rotational arc of more than 360°.

Gear unit 24 typically provides a high mechanical advantage, or gear ratio, whereby a large number of revolutions of the armature of motor 22 are required to cause output shaft to transcribe the necessary arc. It follows that the rotational speed of the motor armature can be quite high, with the result that when the driven device reaches its desired position and motor 22 is deenergized by means of a limit switch or the like, the inertia of the motor rotor prevents the system from stopping immediately. At this point movable stop 14 encounters fixed stop 16, and the output shaft 12 stops abruptly. The energy of the spinning armature must then be dissipated in some manner. It has been found that a direct drive from the motor to the gear unit is unsatisfactory, as the inertia of the spinning armature will cause mechanical damage to the apparatus, usually in the form of gear fractures.

For this reason it has been conventional to provide gear unit 22 with a clutch which allows the motor armature to turn until the friction provided by the clutch absorbs the rotational energy of the armature. At the same time the clutch cannot be so free as to allow substantial slippage when the motor starts, as this would prevent desired, rapid acceleration of the driven device.

The present inventor has found that a direct drive may be utilized, and a clutch eliminated from the system, by securing the gear motor by means of the illustrated torque-absorbing mounting. Referring to FIG. 1, shaft 12 is journaled in plate 25 of the support structure 18, and the opposite end of shaft 12 (not visible) extends through another plate, parallel to plate 25 but on the opposite side of the gear motor unit. In this manner the gear motor is effectively journaled in the support structure by means of the output shafts, or concentric collars about such shafts, so that the gear motor is free to rotate in a plane perpendicular to the shaft axis.

In order to secure the gear motor, an elongate leaf spring 26 is fixed to the gearmotor assembly by means of bolts 28 and 30. In the illustrated embodiment, gear unit 24 is provided with a flat surface at the bottom thereof against which spring 26 may be clamped. However, it will be appreciated that since the motor and gear unit effectively comprise a single structure, spring 26 may be mounted at any other convenient position and still achieve its intended purpose.

The distal end of spring 26 is captured in a bracket 32 and extends therethrough. For reasons to be discussed hereinafter, it has been found advantageous to secure the distal end of the spring against rotation without securing it immovably to the support structure.

Figure 2:
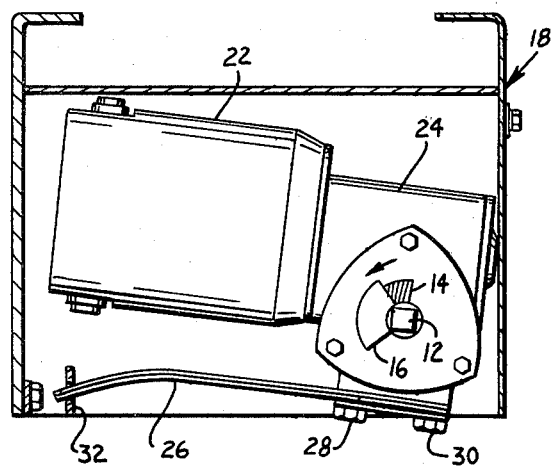
FIG. 2 is a partial cutaway view of FIG. 1 with the apparatus indisposed a first position.

Turning now to FIG. 2, a partially cutaway view of the apparatus of FIG. 1 is shown wherein plate 24 and a portion of coupling 12 has been deleted for the sake of clarity. FIG. 2 illustrates the position of the apparatus immediately after fixed stop 16 has been engaged by movable stop 14, which moves in the direction shown by the arrow. At this instant, rotation of shaft 12 ceases abruptly. However, due to the rotational inertia of the armature of the gear motor and the absence of a clutch therein, the energy of the armature causes the gear motor unit to rotate about shaft 12 in a direction opposite to that in which the shaft was turning. The torque thus spends its self in rotating the gear motor clockwise and thereby deflecting leaf spring 26 in the manner shown. The distal end of the spring is retained by bracket 32, causing the spring to bend into the form shown. It will be appreciated that when the stops first abut and the gear motor begins to rotate about its output shaft axis, the free end of spring 26 moves to the left so that it slides through the opening in bracket 32. As the gear motor proceeds to rotate the spring is deflected generally as shown, the curvature of the spring utilizing more of the spring's length and withdrawing its free end so that it slides to the right, through the opening in bracket 32.

Owing to the high mechanical advantage and inherent friction in the gear drive unit, which in a preferred embodiment is a worm-and-gear drive, the torque exerted by spring 26 cannot force the gear motor to return to its original position. Instead, the motor stays in the position shown until it is energized in the reverse direction, causing shaft 12 to turn back in a clockwise direction.

Figure 3:
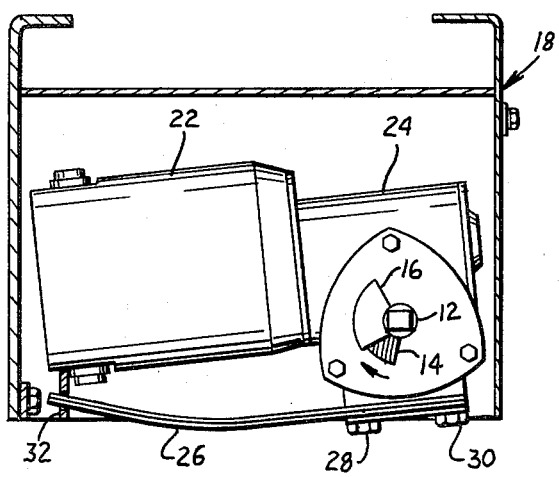
FIG. 3 is a cutaway view similar to FIG. 2, with the apparatus in a second position.

FIG. 3 illustrates the succeeding position of the unit, shaft 12 having been driven in a clockwise direction until stops 14 and 16 meet. As described with respect to FIG. 2, as the gearmotor assembly rotates, the free end of spring 26 slides back and forth through the slot in bracket 32, coming to rest in the position shown wherein the spring is bowed downwardly. While the casing of the motor is shown on close proximity to bracket 32, it is desirable that no fixed objects are placed in the arc of the motor's travel so that the travel is limited solely by the torque exerted by spring 26. As described above, the substantial irreversibility of the gear unit makes it impossible for spring 26 to force the gear motor back to its original position, and the motor unit stays in the position shown until once again energized to rotate shaft 12 in a counterclockwise direction.

Upon gaining an understanding of the present invention, it will be apparent to those skilled in the art that other modifications and applications of the invention are possible. For instance, other forms of spring means besides the illustrated leaf spring may be selected for use. Torsion bars, coil springs and other elastic members may be utilized with appropriate changes in related structural members, while still making use of principles of the invention. It is accordingly intended that the appended claims shall cover all such modifications and applications as do not depart from the true spirit and scope of the invention.

What is claimed as new and desired to be secured by Letters Patent of the United States is:

1. In a gear motor mechanism including an electric motor, a gear drive assembly coupled thereto and having an output shaft, and a support structure for the gear motor and drive assembly, the improvement comprising
   a first stop coupled to said output shaft to rotate therewith;
   a second stop rigidly secured with respect to said support structure and disposed in the path of said first stop; and
   a torque absorbing elongate leaf spring coupled between said motor and said support structure for resiliently resisting rotation of said motor in a plane perpendicular to said output shaft, said leaf spring having a first end coupled to said gear drive assembly, and a second end secured to said support structure to prevent rotation and a plane perpendicular to said output shaft, said second end being free to move longitudinally.

2. The invention defined in claim 1, wherein said support structure comprises a pair of generally planar plates extending on opposite sides of said gear motor and drive assembly, in planes generally perpendicular to the axis of said output shaft, and said leaf spring extends between said plates.

3. The invention defined in claim 1, wherein said first stop comprises a boss formed integrally with a coupling attached to said output shaft.

4. The invention defined in claim 3, wherein said second stop comprises a generally arcuate member extending from said support housing adjacent said output shaft.

* * * * *